US009376055B2

(12) United States Patent
Sura et al.

(10) Patent No.: US 9,376,055 B2
(45) Date of Patent: Jun. 28, 2016

(54) ILLUMINATED EMBLEM

(71) Applicant: Nissan North America, Inc., Franklin, TN (US)

(72) Inventors: Bhargav Sura, Sterling Heights, MI (US); Sean Oliverio, Walled Lake, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 79 days.

(21) Appl. No.: 14/187,982

(22) Filed: Feb. 24, 2014

(65) Prior Publication Data

US 2015/0241016 A1 Aug. 27, 2015

(51) Int. Cl.
*B60Q 1/56* (2006.01)
*B60Q 1/50* (2006.01)
*B60R 13/00* (2006.01)

(52) U.S. Cl.
CPC .. *B60Q 1/56* (2013.01); *B60Q 1/50* (2013.01); *B60R 13/005* (2013.01); *B60Q 2400/50* (2013.01)

(58) Field of Classification Search
CPC ........ B60Q 1/56; B60Q 2400/50; B60Q 1/00; B60Q 1/50; B60Q 2400/00; F21S 48/25; F21S 48/00; F21S 48/30; B60R 13/005
See application file for complete search history.

(56) References Cited

U.S. PATENT DOCUMENTS

| 4,977,695 | A | 12/1990 | Armbruster |
| 6,190,026 | B1 | 2/2001 | Moore |
| 7,195,385 | B2 | 3/2007 | Zimmermann et al. |
| 7,441,801 | B2 | 10/2008 | Nakamura et al. |
| 7,866,858 | B2 | 1/2011 | Hirzmann |
| 7,874,713 | B2 | 1/2011 | Kwon |
| 8,752,989 | B2 * | 6/2014 | Roberts ............ G09F 21/04 362/496 |
| 2004/0223327 | A1 * | 11/2004 | Kuan ............ B60Q 1/2607 362/249.01 |
| 2006/0126352 | A1 | 6/2006 | Kwon |
| 2007/0160334 | A1 | 7/2007 | Cobb et al. |
| 2010/0102538 | A1 | 4/2010 | Paxton et al. |
| 2010/0104780 | A1 | 4/2010 | Paxton et al. |
| 2010/0194080 | A1 | 8/2010 | Paxton et al. |
| 2012/0256543 | A1 | 10/2012 | Marcove et al. |
| 2013/0335997 | A1 * | 12/2013 | Roberts ............ G09F 21/04 362/583 |

FOREIGN PATENT DOCUMENTS

| GB | 2458302 A | 9/2009 |
| JP | 2005-047135 A | 2/2005 |
| JP | 2005-215596 A | 8/2005 |
| JP | 2006-160136 A | 6/2006 |
| JP | 2007-091085 A | 4/2007 |
| JP | 2009-096450 A | 5/2009 |
| JP | 2011-063169 A | 3/2011 |
| WO | 2009145980 A2 | 12/2009 |

* cited by examiner

Primary Examiner — Bao Q Truong

(74) Attorney, Agent, or Firm — Global IP Counselors, LLP

(57) ABSTRACT

An emblem device includes a back plate, an emblem and a lighting device. The emblem overlies the back plate, and has a translucent portion and an opaque portion. The lighting device is disposed between the emblem and the back plate, and is configured and arranged to be able to disperse light though the translucent portion of the emblem.

19 Claims, 13 Drawing Sheets

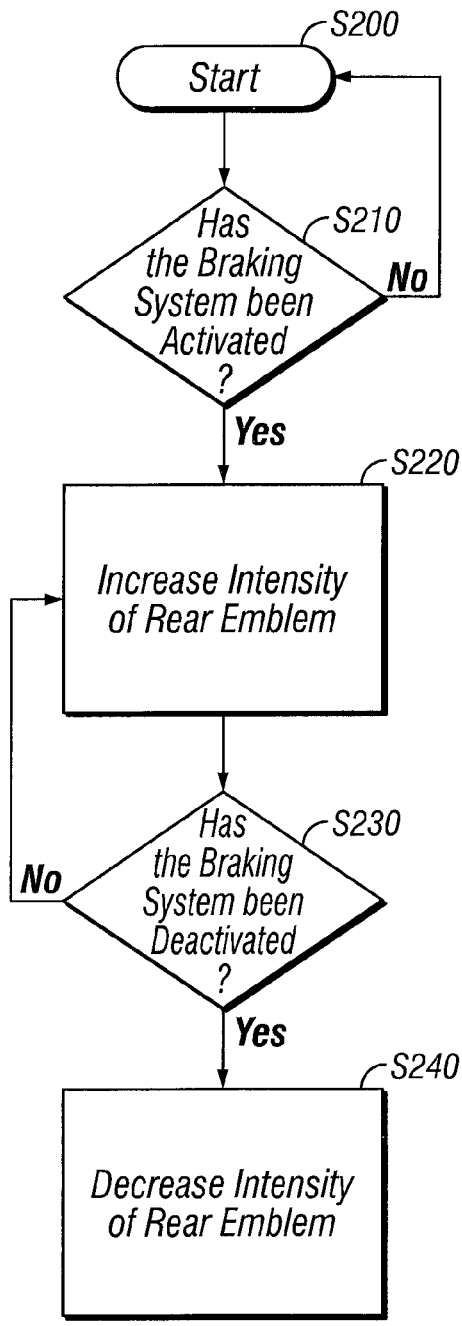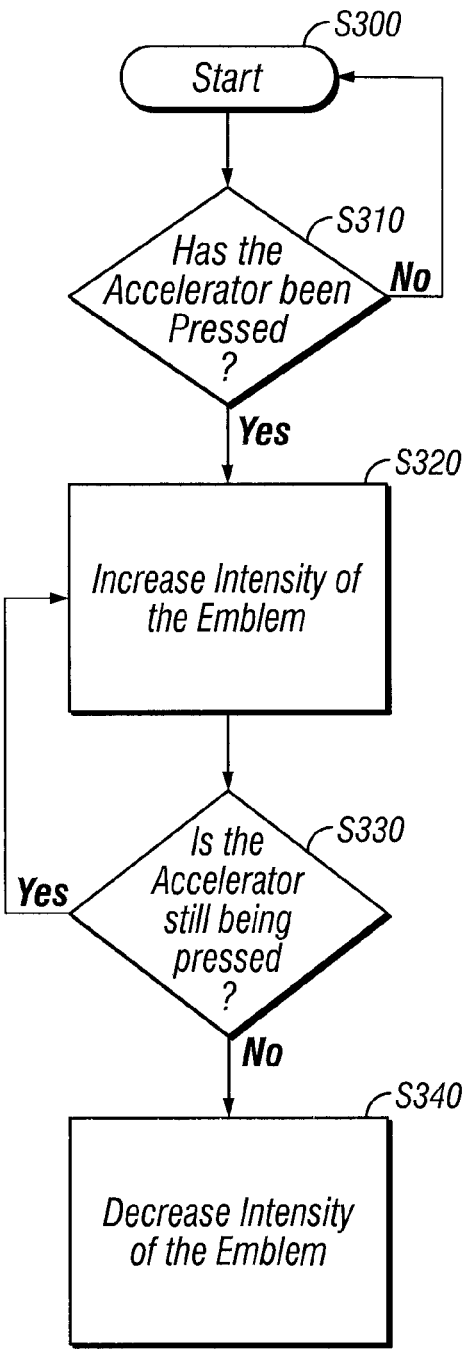
FIG. 13
FIG. 14

ILLUMINATED EMBLEM

BACKGROUND

1. Field of the Invention

The present invention generally relates to an illuminated emblem for a vehicle. More specifically, the present invention relates to an illuminated emblem for a vehicle that has an illuminated periphery.

2. Background Information

Conventional grille emblems that illuminate generally include a multiple piece structure. The multiple piece structure includes a backing plate and a translucent device that is separate from and positioned beneath the emblem, between the emblem and the backing plate. The interior of the translucent device has an interior area with a light source. The emblem is completely opaque, blocking all light. Thus, light is transmitted from underneath and the area surrounding the emblem.

The light source emits light through the translucent device upon unlocking the vehicle and upon opening a door. If the vehicle is started or the doors are closed, the light source turns off.

To further improve the aesthetics of vehicles, a need exists for improved illuminated emblems.

SUMMARY

It has been discovered that to improve illuminated emblems, the emblem can be configured to enable the light source to emit light through a portion or the entirety of the emblem. In one disclosed embodiment, an emblem device comprises a back plate, an emblem and a lighting device. The emblem overlies the back plate, and has a translucent portion and an opaque portion. The lighting device is disposed between the emblem and the back plate, and is configured and arranged to be able to disperse light though the translucent portion of the emblem.

In another embodiment, a vehicle grille assembly comprises a grille base, a back plate, an emblem and a lighting device. The back plate is attached to the grille base. The emblem overlies the back plate, and has a translucent portion and an opaque portion. The lighting device is disposed between the emblem and the back plate, and is configured and arranged to be able to disperse light though the translucent portion of the emblem.

BRIEF DESCRIPTION OF THE DRAWINGS

Referring now to the attached drawings which form a part of this original disclosure:

FIG. 13 is a flow chart illustrating operation of the illuminated emblem when a braking system is operated according to one embodiment;

FIG. 14 is a flow chart illustrating operation of the illuminated emblem when an accelerator is operated according to one embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
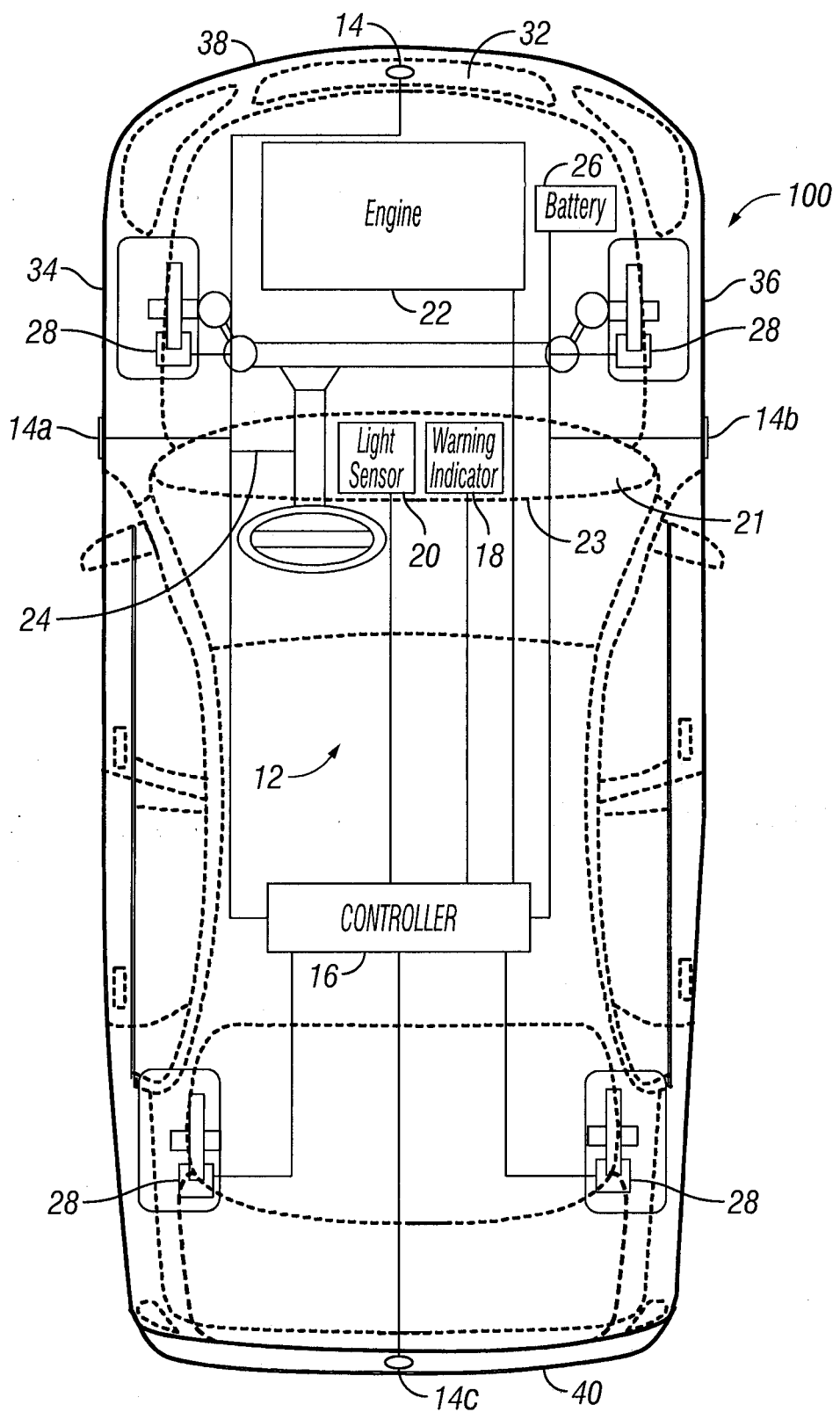
FIG. 1 is a plan view of a vehicle equipped with an illuminated emblem in accordance with one disclosed embodiment.
Figure 2:
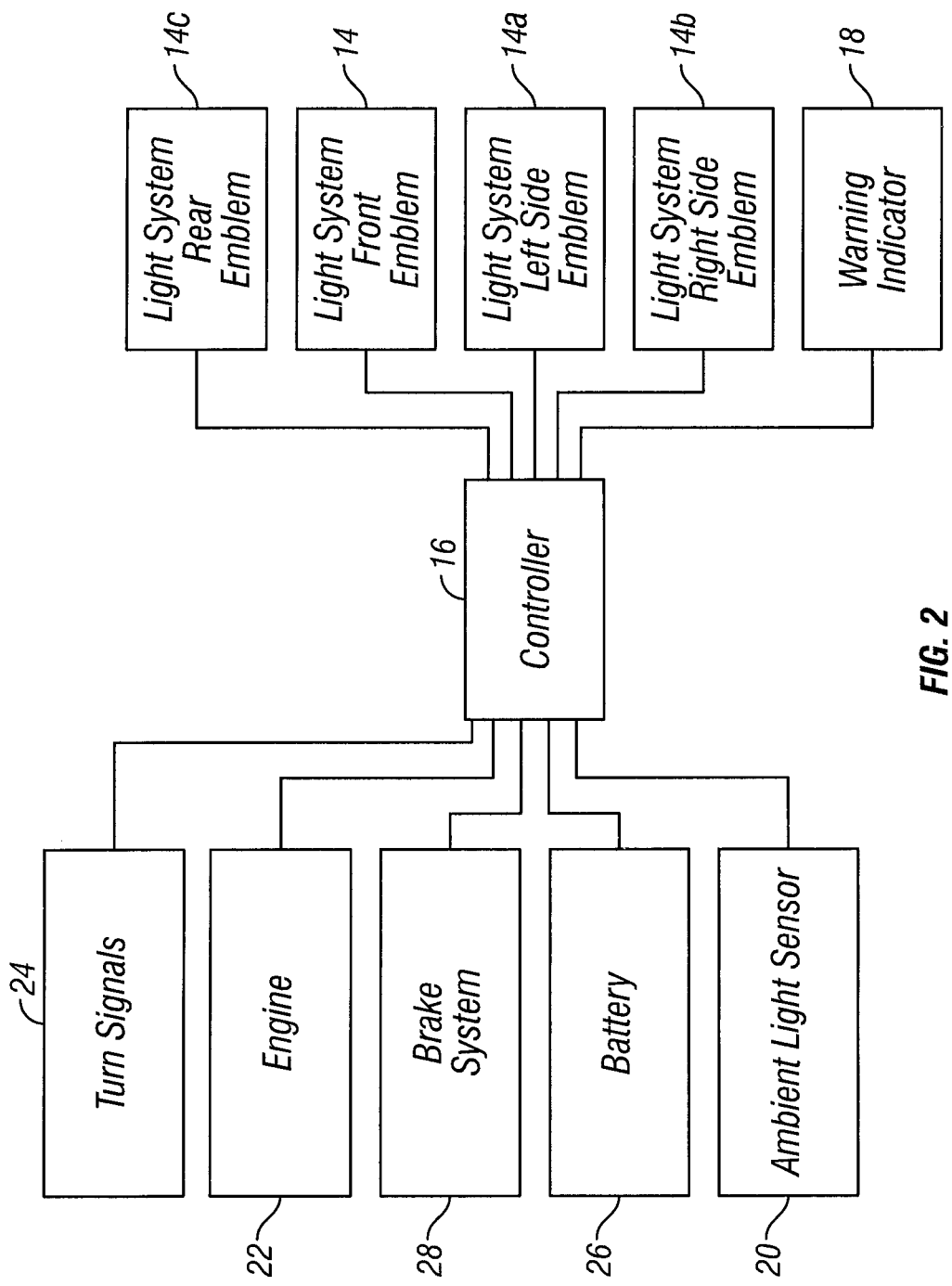
FIG. 2 schematically illustrates a vehicle contact warning system in accordance with one disclosed embodiment.
Figure 3:
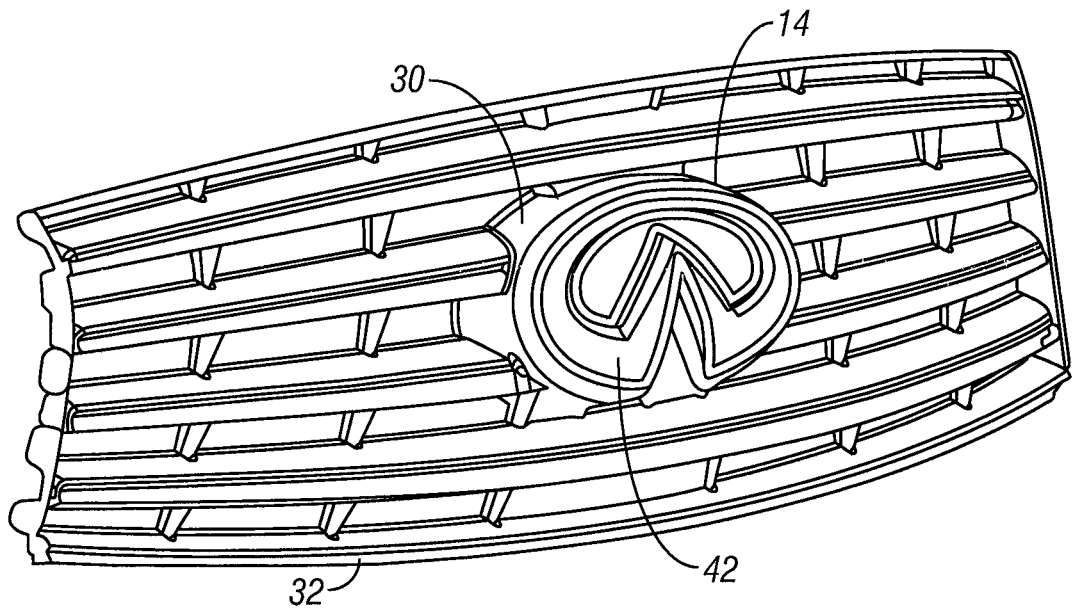
FIG. 3 is a side perspective view of an illuminated emblem attached to a front grille of a vehicle according to one embodiment.
Figure 4:
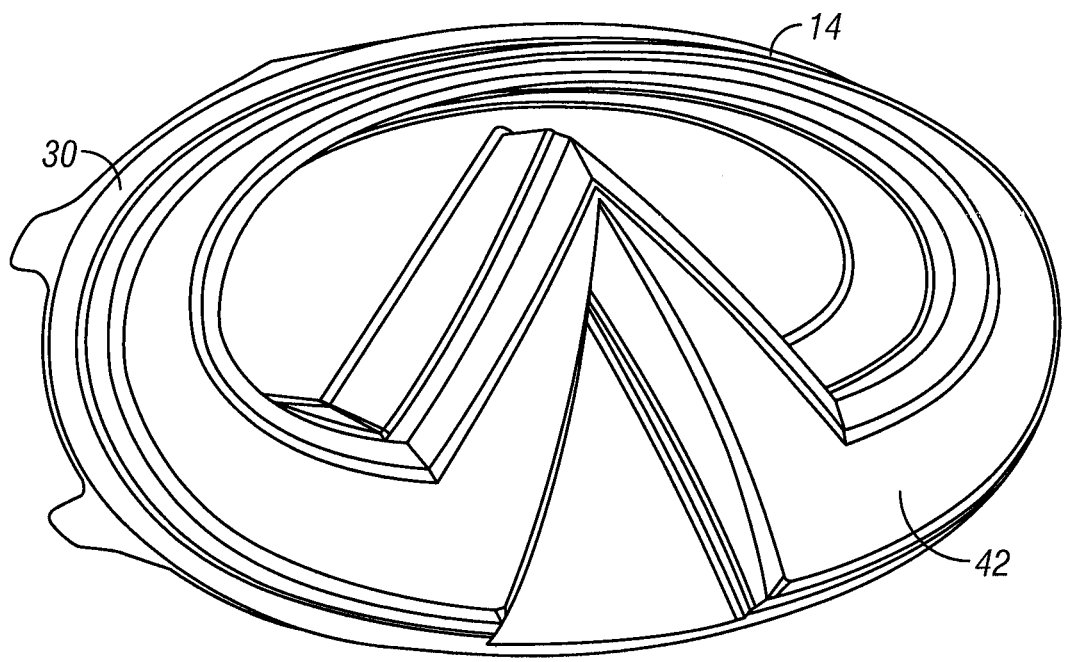
FIG. 4 is enlarged perspective view of the illuminated emblem of FIG. 2.

Referring initially to FIGS. 1 and 2, an illuminated vehicle emblem lighting system 12 is illustrated in accordance with a first embodiment. The vehicle emblem lighting system 12 may be disposed or located on a host vehicle 100 (or on any other suitable apparatus), and includes one or more emblem devices 14, a controller 16, a warning indicator 18 and an ambient light sensor 20. Additionally, as shown in FIGS. 1 and 2, the controller 16 may be in communication with the engine 22, the turn signals 24, the battery 26 and the braking system 28. In one embodiment, the vehicle emblem lighting system 12 may include a front emblem device 14, a left side emblem device 14a, a right side emblem device 14b, and a rear emblem device 14c; however, the vehicle emblem lighting system 12 may include as many or as few emblem devices, as desired. Moreover, the emblem devices may be positioned on any suitable area or surface of the vehicle or other apparatus.

The controller 16 preferably includes a microcomputer with a lighting control program that controls the lighting of the emblem devices 14, 14a, 14b and 14c as discussed below. The controller 16 may also include other conventional components such as an input interface circuit, an output interface circuit, and storage devices such as a ROM (Read Only Memory) device and a RAM (Random Access Memory) device. The microcomputer of the controller 16 is programmed to control the emblem devices 14, 14a, 14b and 14c. The memory circuit stores processing results and control programs such as ones for the vehicle emblem lighting system 12 operation that are run by the processor circuit. The controller 16 is programmed to control vehicle emblem lighting system 12 and is operatively coupled to the emblem devices 14, 14a, 14b and 14c, warning indicator 18, engine 22, the turn signals 24, the battery 26 and the braking system 28 in a conventional manner. The internal RAM of the controller 16 stores statuses of operational flags and various control data. The controller 16 is capable of selectively controlling any of the components of the vehicle emblem lighting system 12 in accordance with the control program. It will be apparent to those skilled in the art from this disclosure that the precise structure and algorithms for the controller 16 can be any combination of hardware and software that will carry out the functions of the present invention. The controller 16 may be the main vehicle controller or may be a controller dedicated to the vehicle emblem lighting system 12.

As shown in FIG. 3-6, the emblem device 14 generally includes a back plate 30, an emblem 42, a lighting device 44, and tape 46. The back plate 30 is connected or attached to the grille or grille base 32 of vehicle 100. However, it is noted that the emblem device 14 can be connected or attached to any portion of vehicle 100 or other suitable structure. For example, as illustrated in FIGS. 1 and 2, the emblem device 14 may be attached to the left side 34 of the host vehicle 100 (emblem 14a), the right side 36 of the host vehicle 100 (emblem 14b), the front 38 of the host vehicle 100, the rear 40 of the host vehicle 100 (emblem 14c), and/or the grille 32 of the host vehicle 100 (emblem 14). It is noted that emblem device 14 generally has the same structure and operation as emblem device 14, 14b and 14c, and therefore, any description of emblem 14 is applicable to emblem devices 14a, 14b and 14c.

As shown in FIGS. 4-7, the back plate 30 is formed from plastic or any suitable material, and, as discussed above, is coupled to the grille 32. In one embodiment, the back plate 30 is generally elliptical in shape and has a raised portion 48, an inner periphery 50, an outer periphery 54, an inner protrusion 56 extending from the inner periphery 50 and an outer protrusion 58 extending from the outer periphery 54. Moreover, the back plate includes recesses or holes 55 that are configured to receive protrusions 68 of the emblem, as discussed in more detail below. The back plate 30 can have one recess 55, no recesses or a plurality of recesses 55. Preferably, the back plate 30 has four recesses 55. Back plate 30 may be an existing back plate that is configured to receive a non-illuminated emblem, in which embodiment, the emblem, along with the lighting device and tape is merely attached to the existing back plate. However, back plate 30 may be a back plate specifically designed to operate with the emblem 42, lighting device 44, and tape 46 described herein.

Figure 5:
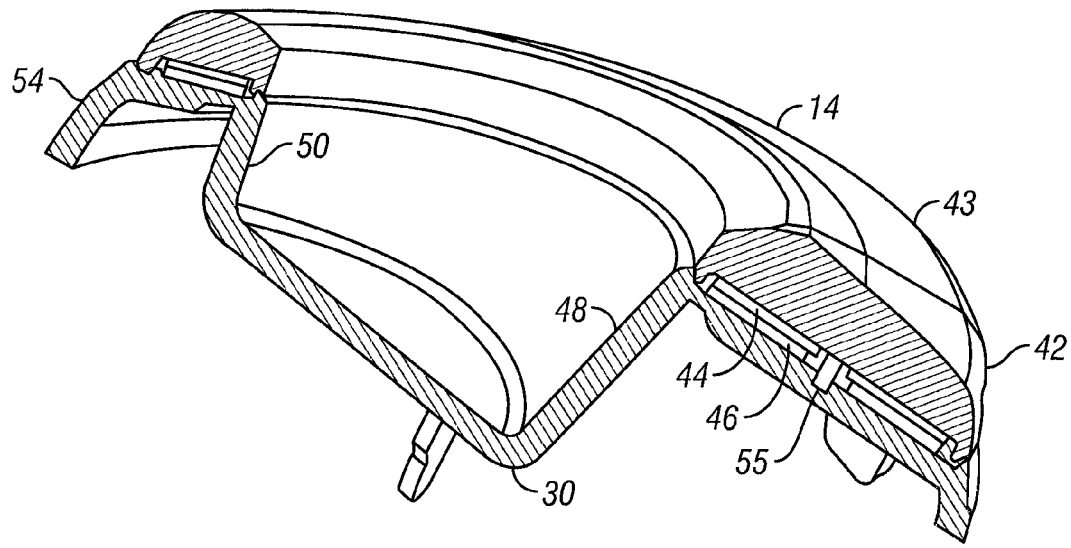
FIG. 5 is a cutaway view of the illuminated emblem of FIG. 2.
Figure 6:
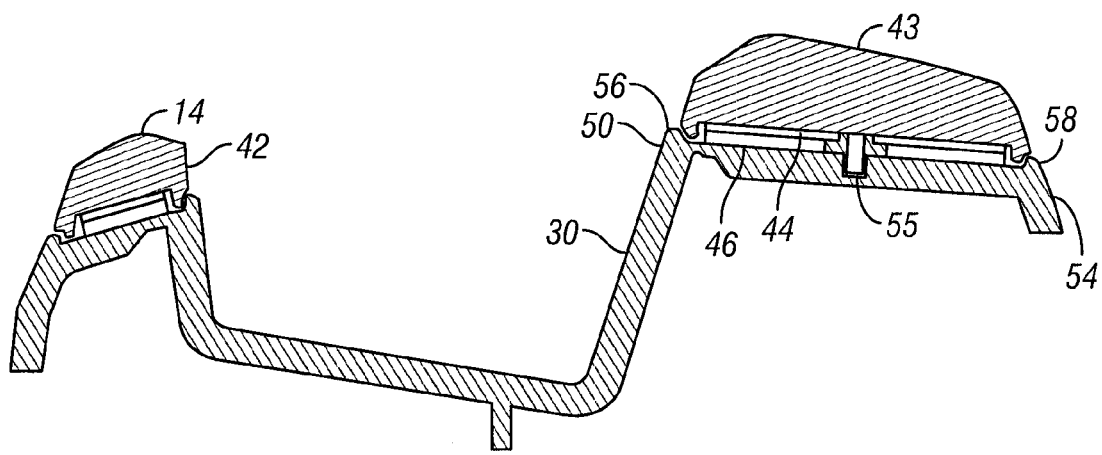
FIG. 6 is a cross-sectional view of the illuminated emblem of FIG. 2.
Figure 7:
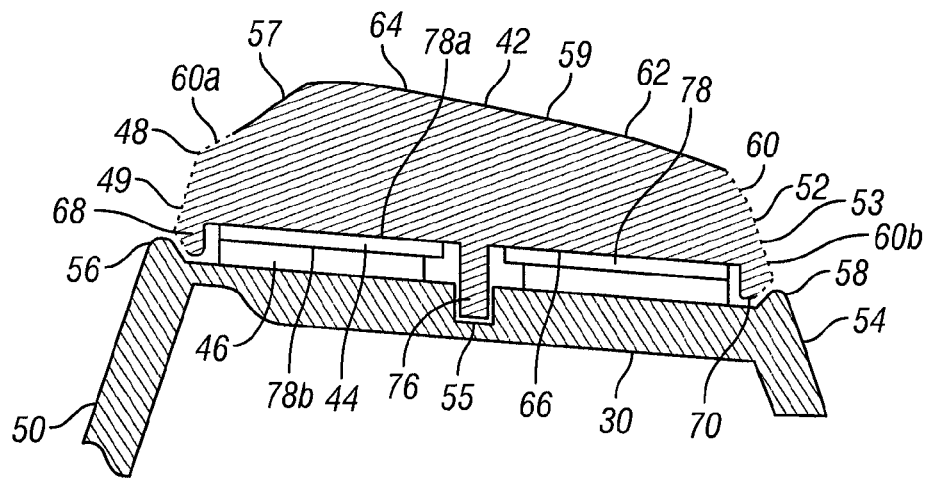
FIG. 7 is enlarged cross-sectional view of the illuminated emblem of FIG. 6 illustrating an embodiment in which the side surfaces of the emblem have a translucent portion.

As illustrated in FIGS. 4-7, the emblem 42 has a body portion 43 that overlies the back plate 30. In this embodiment, the body portion 43 is generally oval with a domed or raised configuration, providing a three dimensional appearance to the emblem. As shown in FIG. 7, the body portion 43 has a first side surface 48 at an inner periphery 49, a second side surface 52 at an outer periphery 53, a first front surface 57 and a second front surface 59. The first and second front surfaces 57, 59 extend at obtuse angles from the first and second side surfaces 49, 52, respectively. However, it is noted that the body portion 43 may have any suitable configuration or shape. The body portion 43 is generally formed of a plastic material, and generally has a constant thickness, but may be formed from any suitable material with any thickness configuration.

The body portion 43 of the emblem 42 has a translucent portion 60 and an opaque portion 62. The translucent portion 60 enables light to pass therethrough, while the opaque portion 62 blocks or restricts all or substantially all light from passing therethrough. In one embodiment, the translucent portion 60 is formed using chrome finishing paint, such as a translucent polycarbonate material, and the opaque portion 62 is formed using a chrome finishing paint that is a non-translucent polycarbonate material; however, the translucent portion 60 and the opaque portion 62 can be formed in any suitable manner. The material used to form the translucent portion 60 is preferably coated or disposed on the exterior surface 64 of the body portion 43 of the emblem 42, while the material used to form the opaque portion 62 is preferably coated or disposed on the interior surface 66 of the body portion 43 of the emblem 42. Although the material used to form the translucent portion 60 is generally only applied to a portion of the emblem 42 that is to be translucent, if desired, the material used to form the translucent portion 60 can overlap some or the entire opaque portion 62. The material used to form the opaque portion 62 is generally only applied to the portion of the emblem 42 that is to be opaque or restrict light from passing therethrough. The translucent portion 60 may be applied in any configuration or design. For example, in one embodiment, the translucent material is an outline of a vehicle emblem, but may be the entire emblem, a word or any other predetermined design or configuration. Moreover, the opaque portion and the translucent portion may be applied to any surface and in any manner desired.

In the embodiment illustrated in FIGS. 5-7, the translucent portion 60 includes an inner translucent portion 60a and an outer translucent portion 60b, the inner translucent portion 60a being disposed on the first side surface 48 adjacent the inner periphery 49 and the outer translucent portion 60b being disposed on the second side surface 52, adjacent the outer periphery 53. In this embodiment, the translucent portions 60a and 60b extend approximately 1 mm-3 mm along the first and second side surfaces 48, 52, and more preferably about 1 mm, but may extend at any suitable distance along the first and second side surfaces 48, 52. Moreover, as illustrated in FIG. 7, the inner translucent portion 60a and the outer translucent portion 60b may extend even further along the first and second side surfaces 48, 52.

As illustrated in FIGS. 6 and 7, the inner periphery 49 and outer periphery 53 of the body portion 43 of the emblem 42 have an inner projection 68 and an outer projection 70, respectively. The inner projection 68 and an outer projection 70 extend downwardly toward the back plate 30. The inner projection 68 and the outer projection 70 are configured to be positioned inside and adjacent the inner protrusion 56 and outer protrusion 58 of the back plate 30, respectively, so as to completely encapsulate the lighting device, and couple the body portion 43 to the back plate 30. However, if desired, the inner projection 68 and the outer projection 70 can be one of a plurality of projections and can partially or substantially encapsulate the lighting device. In one embodiment, a gasket or seal (not shown) may be positioned between the inner projection 46 of the back plate 30 and the inner projection 68 of the emblem 42 and the outer projection 58 of the back plate 30 and the outer projection 70 of the emblem 42 to form a water proof or substantially water proof seal. Moreover, as illustrated in FIG. 7, the inner translucent portion 60a and an outer translucent portion 60b may extend along the inner projection 68 and the outer projection 70, respectively. The translucent portions 60a and 60b may disposed only on a portion of a respective protrusion 68 and 70, only on the first side surface 48 and the second side surface 52 or any combination thereof.

Moreover, the body portion 43 of the emblem 42 may have a plurality of pins or protrusions 76 that extend inwardly from the interior surface 66 of the body portion 43 and may be inserted into the recesses or holes 55 in the back plate 30 so as to be substantially perpendicular to the back plate 30. By inserting the pins 76 into the recesses 55 in the back plate 30, the emblem 42 may be easily and properly positioned on the back plate 30. The body portion 43 of the emblem 42 preferably has four pins, but can have one pin or a plurality of pins, as desired.

In one embodiment, the lighting device 44 is disposed between the emblem 42 and the back plate 30, and is configured and arranged so to be able to disperse light though the translucent portion 60 of the emblem 42. The lighting device 44 may include a lighting circuit 78 disposed between the emblem 42 and the back plate 30, and preferably includes at least one lamp 84 such as a light emitting diode (LED) disposed on the lighting circuit 78.

Figure 8:
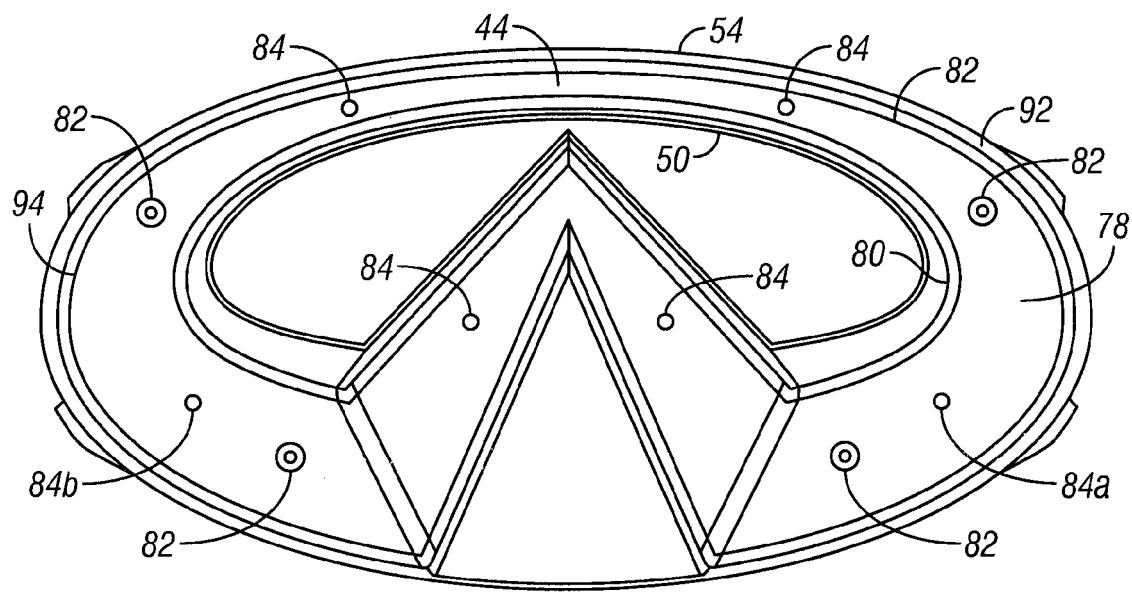
FIG. 8 is front view of the illuminated emblem of FIG. 2 with the emblem removed showing the light panel that underlies the emblem.

Moreover, as illustrated in FIGS. 6-8, the lighting circuit 78 has generally the same shape or configuration as the emblem body when viewed from above, and thus is generally oval in shape with a first side 78a, a second side 78b, inner periphery 80 and an outer periphery 82. The lighting circuit 78 may include openings or passages 82 disposed therein, so as to allow the pins 76 from the body portion 43 of the emblem 42 to pass therethrough.

As illustrated in FIG. 8, lighting device 44 may include a plurality of lamps 84 positioned at separate locations on the lighting circuit 78. In this embodiment, the lighting circuit 78 includes six lamps 84 (e.g., LEDs) disposed at separate locations on the lighting circuit 78. Preferably, the lamps 84 are spaced so as to enable consistent lighting along the inner and outer periphery 49, 53 of the body portion 43. The lamps 84 can be any suitable color, or combination of colors, and can be capable of emitting a plurality of colors, if desired. However, it is noted that the lighting device 44 may include as many or as few lamps 84 as desired, and the lamps 84 may be positioned in any manner.

Figure 9:
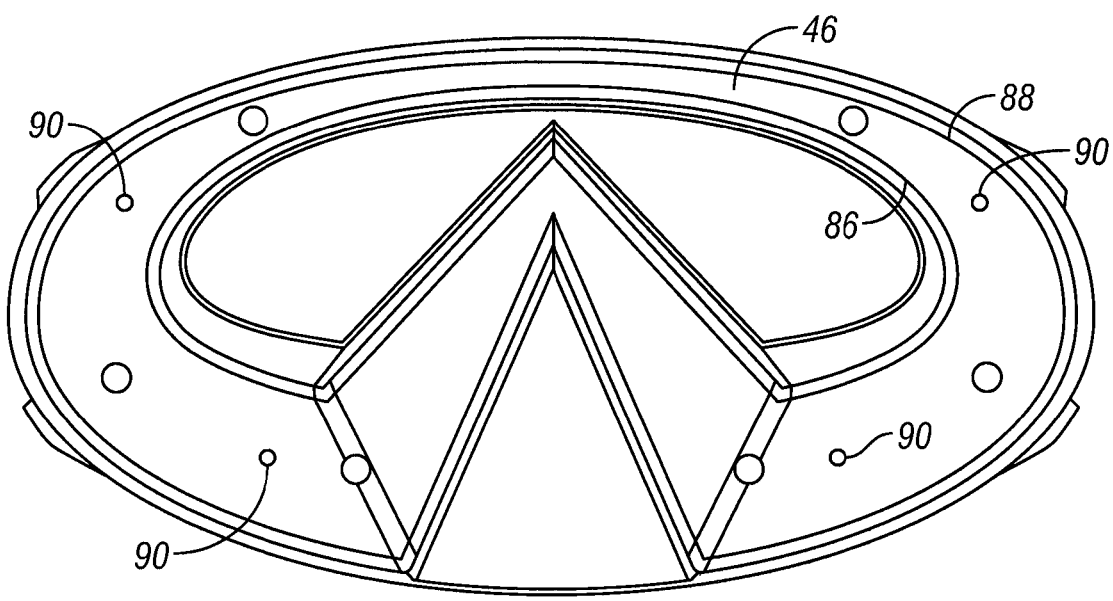
FIG. 9 is a front view of the illuminated emblem of FIG. 7 with the light panel removed, showing the tape that attaches the light panel to the back plate.

As shown in FIGS. 6, 7 and 9, tape 46 may be disposed between the lighting circuit 78 and the back plate 30. Tape 46 has generally the same shape or configuration as the lighting circuit 78 body when viewed from above, and thus is generally oval in shape with an inner periphery 86 and an outer periphery 88. Moreover tape 46 preferably has passages or openings 90 that enable the pins 76 from the body portion 43 of the emblem 42 to pass therethrough. Tape 46 is preferably any suitable double sided tape that enables the lighting circuit 78 to be fixed to the back plate 30.

Figure 10:
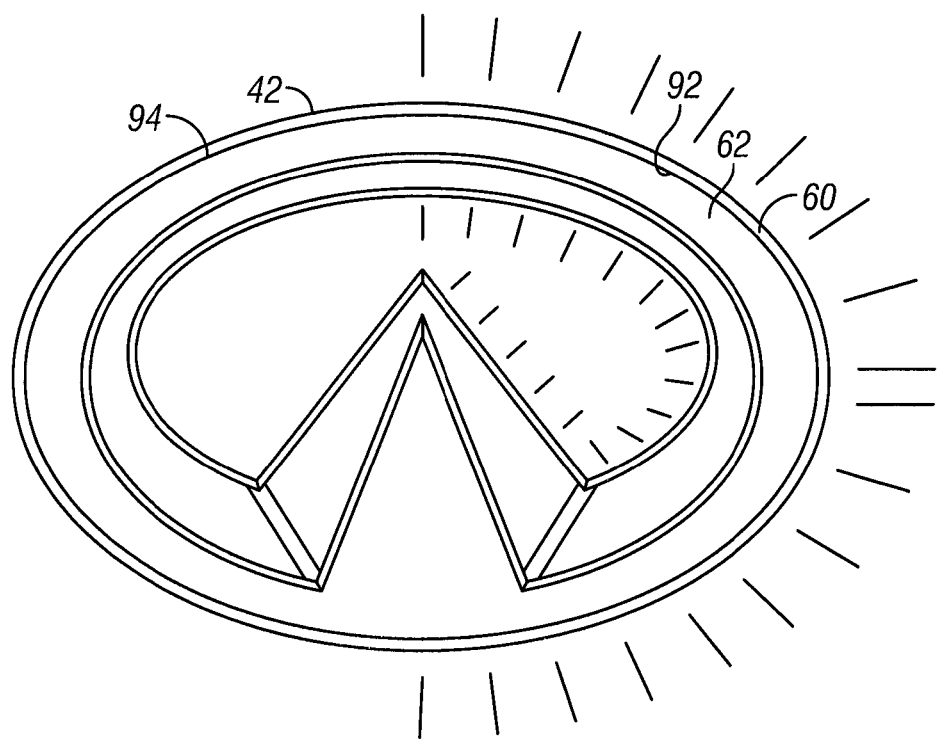
FIG. 10 is an illuminated emblem in accordance with one embodiment in which a portion of the light panel is capable of lighting.
Figure 11:
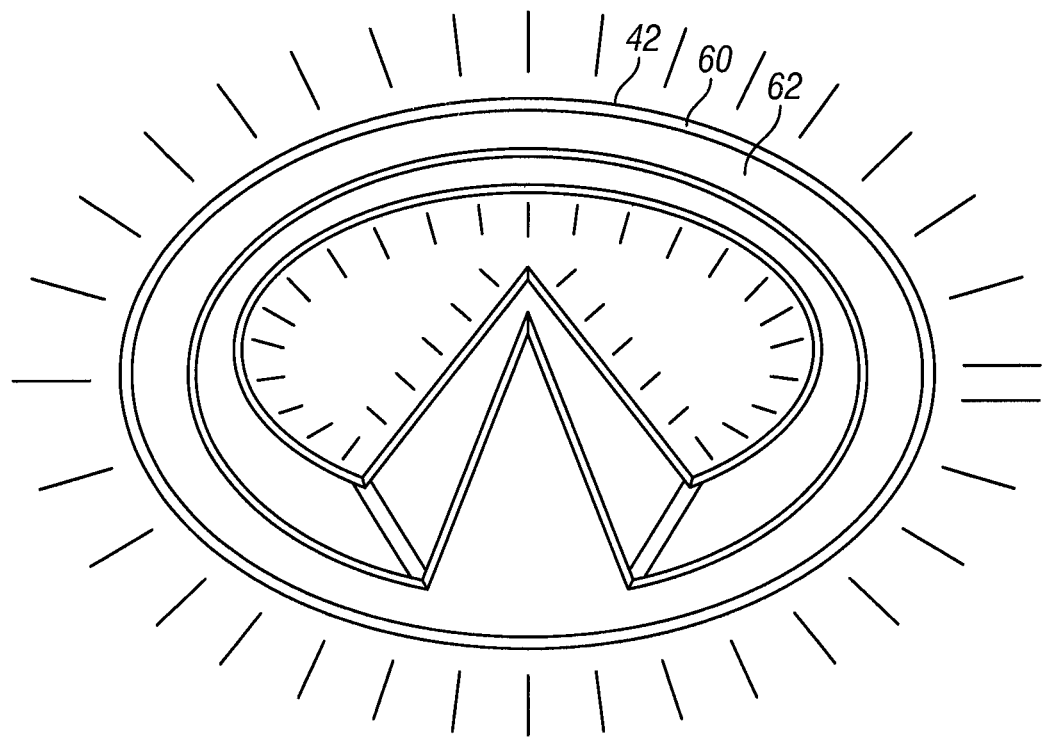
FIG. 11 is an illuminated emblem in accordance with one embodiment in which the entire periphery of the light panel is capable of lighting.

Turning to FIGS. 10 and 11, the configuration of the emblem 42 enables the light from the lamps 84 to be emitted through the translucent portion 60 of the body portion 43. This illumination forms an inner and outer outline of the emblem, and enables increased visibility and enhanced aesthetics of the emblem 42 during both nighttime and daylight hours.

In one embodiment, the controller 16 is configured to alter the color emitted by the lighting device 44 based on a change in operation status of host vehicle 100 equipped with the emblem device. For example, the light emitted from the lamps 84 may be emitted during non-driving activities, such as during unlocking, locking, startup and/or shut down of host vehicle 100. In this embodiment, the light from the lamps 84 may emit light for a predetermined time to enable lighted approach or egress from the host vehicle 100. The controller 16 may be configured to cause the lighting device 44 to emit a light, such as a purple light or any other suitable light, while the host vehicle 100 is in park mode. The lamps 84 would cease emitting light upon the host vehicle 100 being operated in a forward or rearward direction, after the predetermined time, or after the occurrence of another predetermined action.

In this embodiment, the controller 16 may be in communication with any suitable system, such as the door locking system, an engine control module, the transmission and any other suitable system. That is, for any system in which it is desired to change or activate the illuminated emblem, the system would send a signal to the controller 16 indicating the system has been activated, deactivated, altered or a condition of the system is changed. At such a time, the controller 16 would then send a signal to the lighting circuit 78 so as to alter or activate the lamps 84 on the lighting circuit 78. Such connection to the controller 16 is conventional and is therefore not discussed in detail herein.

In other embodiments, the lamps 84 may emit light based on specific operations of the host vehicle 100 in addition to or rather than during non-driving activities. In one embodiment, the controller 16 is programmed to alter the illumination intensity of the lighting device 44 based on a determination that a turn signal of the host vehicle 100 equipped with the emblem device 14 has been activated.

Figure 12A:
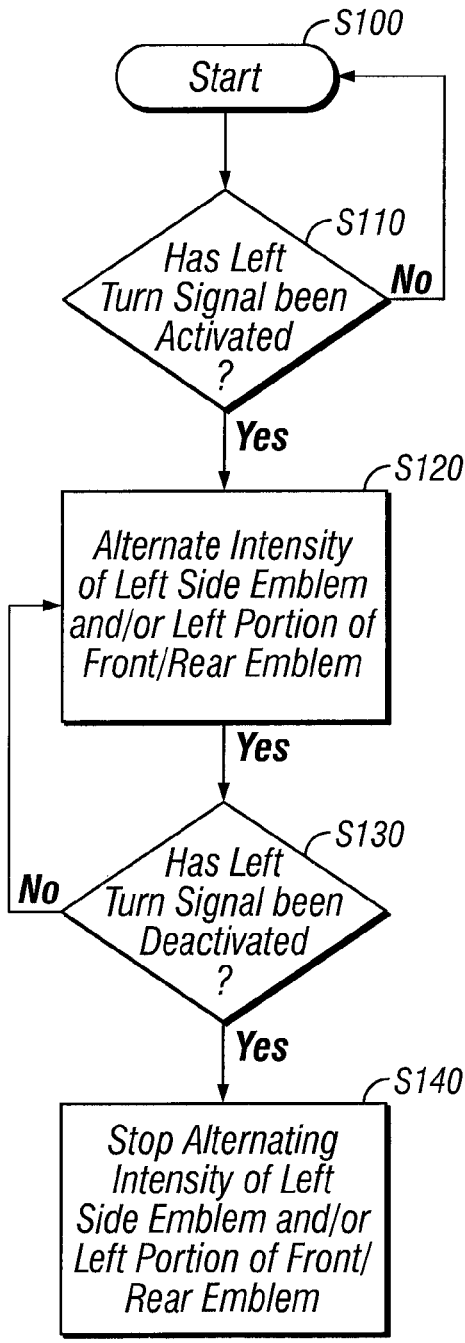
FIG. 12A is a flow chart illustrating operation of the illuminated emblem when a left turn signal is operated according to one embodiment.

FIG. 12A illustrates the process through which the controller determines the illumination intensity in one embodiment. In this embodiment, the vehicle emblem lighting system 12 starts at S100. At S110, the controller 16 determines whether an operator of the host vehicle 100 activates the left turn signal. When the operator of the host vehicle has not activated the left turn signal, the vehicle emblem lighting system 12 returns to S100. When the operator of the host vehicle 100 has activated the left turn signal, an activation signal is transmitted to the controller 16. The controller 16 in turn activates at least one of the left side emblem device 14a and a left portion of the front emblem device 14 and the rear emblem device 14c, so as to alternate the intensity of the lighting device 44 (S120). The controller 16 then determines whether the left turn signal has been deactivated at S130. If the left turn signal has not been deactivated, the controller 16 returns the vehicle emblem lighting system 12 to S120 and maintains the alternating intensity of the lighting device 44. When the controller 16 determines that the left turn signal has been deactivated, the controller 16 stops or terminates the alternating intensity of the lighting device 44 at S140.

Figure 12B:
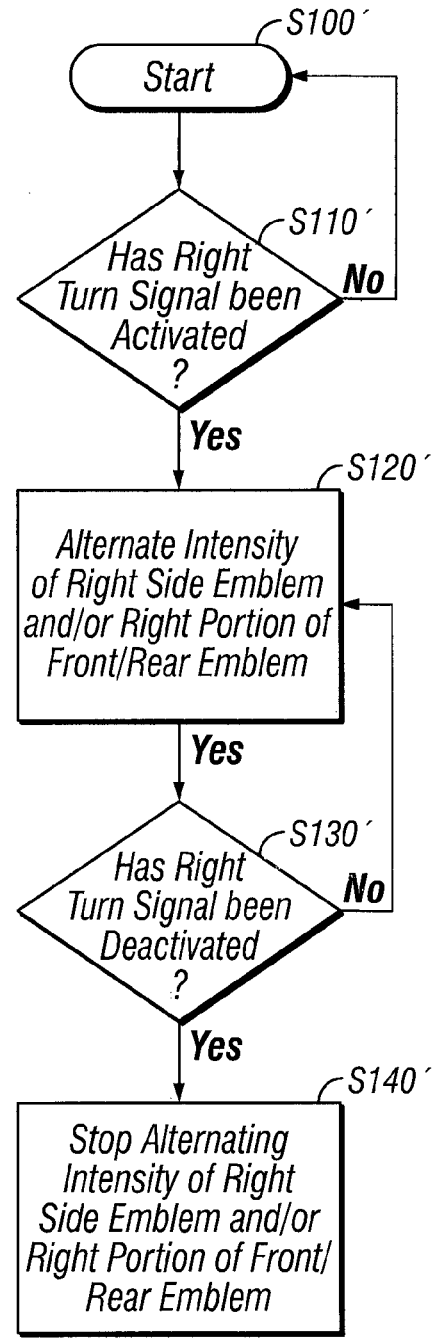
FIG. 12B is a flow chart illustrating operation of the illuminated emblem when a right turn signal is operated according to one embodiment.

The right side turn signal process is similar to the left side turn signal process. As shown in FIG. 12B at step S110' the controller 16 determines whether an operator of the host vehicle 100 activates the right turn signal. When the operator of the host vehicle has not activated the right turn signal, the vehicle emblem lighting system 12 returns to S100'. When the operator of the host vehicle 100 has activated the right turn signal, an activation signal is transmitted to the controller 16. The controller 16 in turn activates at least one of the right side emblem device 14*b* and a right portion of the front emblem device 14 and the rear emblem device 14*c*, so as to alternate the intensity of the lighting device 44 (S120'). The controller 16 then determines whether the right turn signal has been deactivated at S130'. If the right turn signal has not been deactivated, the controller 16 returns the vehicle emblem lighting system 12 to S120' and maintains the alternating intensity of the lighting device 44. When the controller 16 determines that the right turn signal has been deactivated, the controller 16 stops or terminates the alternating intensity of the lighting device 44 at S140'.

When the emblem 42 is positioned on the side of the host vehicle 100 (e.g., emblem devices 14*a* and 14*b*), the controller 16 may alter the intensity such that the entire inner and outer periphery of emblem devices 14*a* and/or 14*b* is illuminated at alternating differing predetermined intensities or such that the lamps 84 alter between emitting no light and emitting light at a predetermined intensity (FIG. 11).

As shown in FIGS. 8 and 10, in one embodiment, the lighting device 44 includes a first light or lamp 84*a* and a second light or lamp 84*b*, the first light or lamp 84*a* is configured to disperse light through a first portion 92 of the translucent portion 60 and the second light or lamp 84*b* configured to disperse light through a second portion 94 of the translucent portion 60. The controller 16 is programmed to alter the illumination intensity of one of the first and second lights based on a determination that a turn signal of host vehicle 100 equipped with the emblem device 14 has been activated. Such a configuration can be useful when the emblem device 14 is positioned or disposed on the front portion 38 or rear portion 40 of the host vehicle 100, as shown in FIG. 1. Thus, when signaling for a left turn, the left side of the emblem 42 can be illuminated, and when signaling a right turn, the right side of the emblem 42 can be illuminated. As with the embodiment illustrated in FIG. 10, the illumination of the lamps 84 or LEDs may alternate at differing predetermined intensities or such that the lamps 84 alter between emitting no light and emitting light at a predetermined intensity.

In one embodiment, the lamps 84 are capable of emitting a red light, and the controller 16 is programmed to alter the illumination intensity of the lighting device 44 based on a determination that the braking system 28 of the host vehicle 100 equipped with the emblem device 14 has been activated. That is, when the host vehicle 100 operator presses the brake pedal (not shown) of the host vehicle 100, the braking system 28 of the host vehicle 100 is activated. The braking system 28 transmits a signal to the controller 16, which in turn transmits a signal to the rear emblem device 14*c* that causes the lamps 84 to produce a red (or other suitable color) brake light or increased illumination. In this embodiment, preferably the entire inner periphery 49 and outer periphery 53 of the emblem 42 is illuminated. When the brake pedal is released, the braking system 28 transmits a signal to the controller, which in turn transmits a signal to deactivate the brake light or increased illumination.

FIG. 13 illustrates the process through which the controller determines the illumination intensity in one embodiment. In this embodiment, the vehicle emblem lighting system 12 starts at S200. At S210, the controller 16 determines whether an operator of the host vehicle 100 has activated the braking system 28. When the operator of the host vehicle 100 has not activated the braking system 28, the vehicle emblem lighting system 12 returns to S200. When the operator of the host vehicle 100 has activated the braking system 28, an activation signal is transmitted to the controller 16. The controller 16 in turn activates the rear emblem device 14*c*, so as to increase the intensity of the lighting device 44 (S220). The controller 16 then determines whether the braking system 28 has been deactivated at S230. If the braking system 28 has not been deactivated, the controller 16 returns the vehicle emblem lighting system 12 to S220 and maintains the increased intensity of the lighting device 44. When the controller 16 determines that the braking system 28 has been deactivated, the controller 16 decreases or terminates the increased intensity of the lighting device 44 at S240.

In one embodiment, the controller 16 is configured to alter the intensity of the illumination of the lighting device 44 based on an engine revolutions per minute (RPM) of host vehicle 100 equipped with the emblem device 14. That is, when the host vehicle 100 operator presses the accelerator (not shown), the engine RPM of the host vehicle 100 increases. The engine 22 transmits a signal to the controller 16, which in turn transmits a signal to the any or all of the emblem devices 14, 14*a*, 14*b* and 14*c* that causes the lamps 84 to produce light or increased illumination. In this embodiment, preferably the entire inner periphery 49 and outer periphery 53 of the emblem 42 is illuminated.

Moreover, the controller 16 may be programmed to only produce this illumination when the host vehicle 100 is in park mode, neutral, in gear or in any suitable mode or combination of modes. When the accelerator is released, the engine 22 transmits a signal to the controller 16, which in turn transmits a signal to deactivate the emblem 42 or decrease the illumination. In this embodiment, the intensity of the illumination can increase in conjunction with an increase in the engine RPM. That is, there may be a linear increase in intensity of the emblem based on a linear increase in RPM.

FIG. 14 illustrates the process through which the controller determines the illumination intensity in this embodiment. In this embodiment, the vehicle emblem lighting system 12 starts at S300. At S310, the controller 16 determines whether an operator of the host vehicle 100 has pressed the accelerator. When the operator of the host vehicle 100 has not pressed the accelerator, the vehicle emblem lighting system 12 returns to S300. When the operator of the host vehicle 100 has pressed the accelerator, an activation signal is transmitted to the controller 16. The controller 16 in turn activates any of the emblems 14, 14*a*, 14*b*, and 14*c*, so as to increase the intensity of the lighting device 44 (S320). The controller 16 then determines whether the operator of the host vehicle 100 is no longer pressing the accelerator at S330. If the accelerator is still being pressed, the controller 16 returns the vehicle emblem lighting system 12 to S320 and maintains the increased intensity of the lighting device 44. When the controller 16 determines that the accelerator is not being pressed, the controller 16 decreases or terminates the increased intensity of the lighting device 44 at S340.

In one embodiment, the controller 16 is configured to alter the intensity of the illumination of the lighting device 44 based on a change in a charge level of the battery 26 of host vehicle 100 equipped with the vehicle emblem lighting system 12. The battery 26 transmits a signal to the controller 16, which in turn transmits a signal to the front emblem device 14 (or any other suitable emblem device) that causes the lamps 84 to produce illumination based on the status of the battery 26. That is, when the battery 26 is fully charged the emblem device 14 may illuminate at a first predetermined intensity. As the battery charge decreases the emblem device 14 illumination may decrease (i.e., the emblem device 14 illuminates at a second predetermined intensity that is lower than the first predetermined intensity). In this embodiment, preferably the entire inner periphery 49 and outer periphery 43 of the emblem 42 is illuminated. The battery 26 may be any vehicle battery for a vehicle that operates on fossil fuel, a vehicle that operates on battery power, or any combination thereof or any other battery.

In one embodiment, the lamps 84 can emit differing colors based on the charge level. For example, when the battery 26 is fully charged, the lamps 84 may emit a green color, when the battery 26 is low on charge, the lamps 84 may emit a yellow color, and when the battery 26 has no charge or substantially no charge, the lamps 84 may emit a red color. It is noted that the lamps 84 may emit any color based on the charge level, and the colors discussed herein are merely exemplary.

Figure 15:
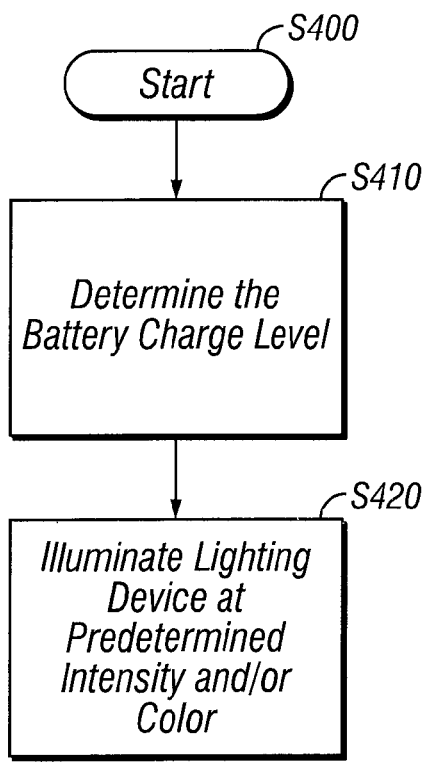
FIG. 15 is a flow chart illustrating operation of the illuminated emblem based on a battery charge level according to one embodiment.

FIG. 15 illustrates the process through which the controller determines the illumination intensity in one embodiment. In this embodiment, the vehicle emblem lighting system 12 starts at S400. At S410, the controller 16 determines the charge level of the battery 28. Based on the charge level of the battery 28, the controller 16 causes the lighting device to illuminate at a predetermined intensity and/or color at S420.

In one embodiment, the controller 16 is configured to alter the color emitted by the lighting device 44 based on a change in ambient light in an area adjacent the emblem 42. In this embodiment, the ambient light sensor 20 senses or determines the ambient light in the area surrounding or adjacent the host vehicle 100 equipped with the vehicle emblem lighting system 12. The ambient light sensor 20 may be a photoelectric sensor, a photocell, a light-dependent resistor, or any other suitable device. As discussed herein, the ambient light sensor 20 is used to detect ambient light or brightness in a manner similar to a human eye. In one embodiment, the ambient light sensor 20 provides an input signal to the controller 16 that is indicative of the ambient light conditions in and around the host vehicle 100. The controller 16 then adjusts the illumination of the lamps 84 based on the ambient light. That is, during daylight the light emitted by the lamps 84 may be a first color or intensity and during nighttime hours, the light emitted by the lamps 84 may be a second color or intensity, the first color or intensity being a different color or intensity than the second color or intensity. In addition, the controller 16 can be programmed to extinguish the illumination during the daylight hours or any other suitable time.

Turning back to FIG. 1, the ambient light sensor 20 is preferably located on the dashboard 21 or another forward portion of an instrument panel 23. The ambient light sensor 20 may be a dual purpose sensor in that it is capable of determining ambient lighting conditions for the purpose of activating headlights, as is known in the art, and for the purpose of executing operation of the vehicle emblem lighting system 12 as described herein. Of course, the host vehicle 100 can have separate sensors for each of these purposes or the host vehicle 100 may have only the vehicle emblem lighting system 12 in the absence of a conventional auto light feature.

Additionally, the host vehicle 100 may have light sensors on the exterior of the vehicle. The exterior sensors may be mounted on any suitable external portion of the host vehicle 100, including the front and rear quarter panels, the bumpers, the external mirrors or any combination of suitable areas.

Figure 16:
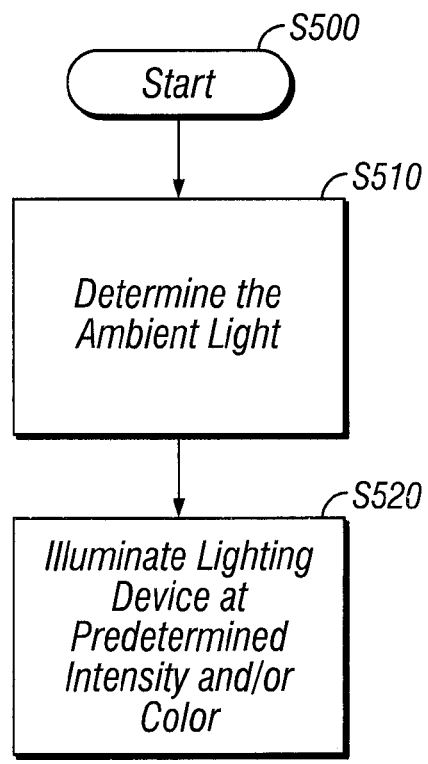
FIG. 16 is a flow chart illustrating operation of the illuminated emblem based on feedback from a light sensor according to one embodiment.

FIG. 16 illustrates the process through which the controller determines the illumination intensity in one embodiment. In this embodiment, the vehicle emblem lighting system 12 starts at S500. At S510, based on a signal from the ambient light sensor 20, the controller 16 determines the ambient light adjacent the host vehicle 100. Based on the ambient light adjacent the host vehicle 100, the controller causes the lighting device to illuminate at a predetermined intensity and/or color at S520.

In one embodiment, the controller 16 is configured to determine whether a light output of a light in the lighting device 44 meets a predetermined minimum condition. If the light fails to meet the predetermined minimum condition, the controller 16 is configured to notify an operator of host vehicle 100 equipped with the emblem device 14 when the controller 16 determines that the light output of the light in the lighting device 44 does not meet the predetermined minimum condition. Such notification can be via the warning indicator 18 on the dashboard 21 of the host vehicle 100. The warning indicator 18 may be visual or auditory, or any combination thereof. Moreover, if desired, the warning indicator 18 may be tactile, such as by seat or steering wheel vibration, or any other suitable warning or combination of warnings. The warning indicator 18 can be disposed on any portion of the host vehicle 100 and be any type of warning desired.

Thus, if one or more lamps 84 are not producing light at a predetermined minimum amount or are not producing any light, the controller 16 will transmit a signal to the warning indicator 18 notifying the operator of the host vehicle 100 that the emblem 42 illumination is deficient.

Figure 17:
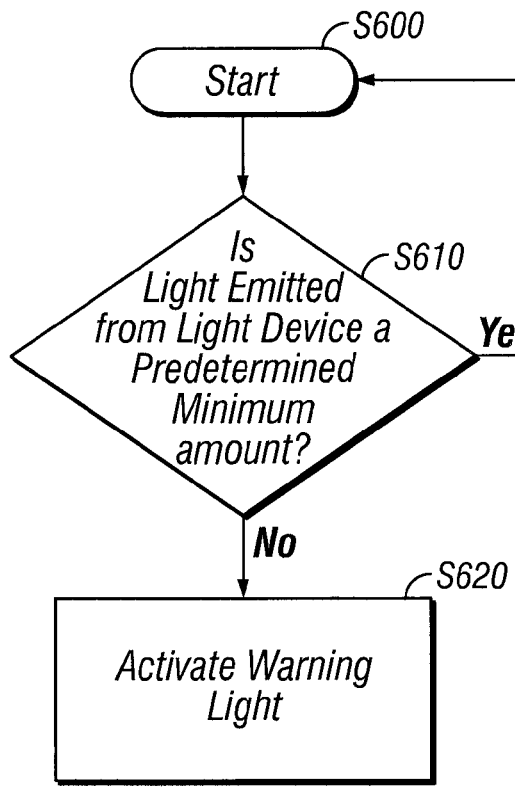
FIG. 17 is a flow chart illustrating operation of a warning indicator according to one embodiment.

FIG. 17 illustrates the process through which the controller determines the illumination intensity in one embodiment. In this embodiment, the vehicle emblem lighting system 12 starts at S600. At S610, based on a signal from the emblem device 14, the controller 16 determines whether the lighting device 44 is emitting light at a predetermined minimum amount. If the lighting device 44 is emitting light at the predetermined minimum amount, the vehicle emblem lighting system 12 returns to the start at S600. If the lighting device 44 is not emitting light at a predetermined minimum amount, the controller 16 activates warning indicator 18 on the dashboard 21 of the host vehicle 100.

Second Embodiment

Figure 18:
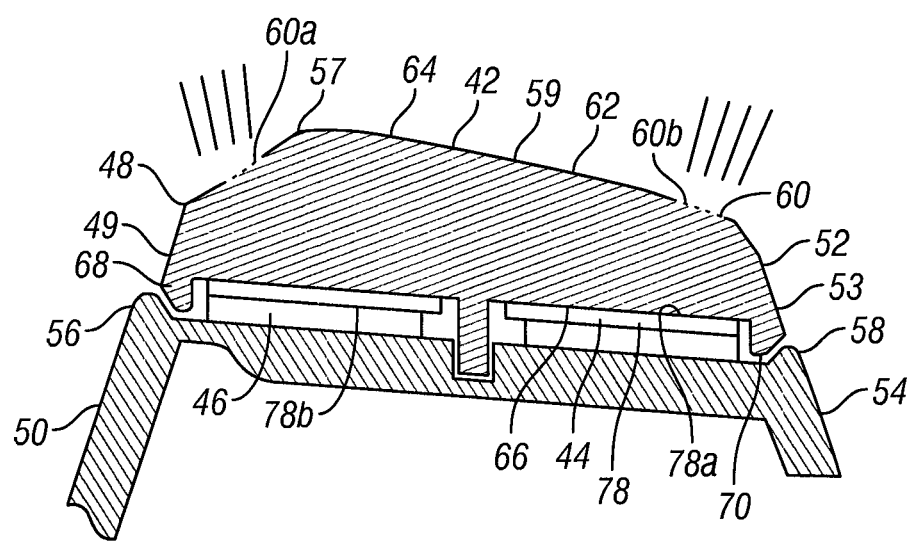
FIG. 18 is enlarged cross-sectional view of another embodiment of the illuminated emblem of FIG. 6 in which front surfaces of the emblem have a translucent portion.
Figure 19:
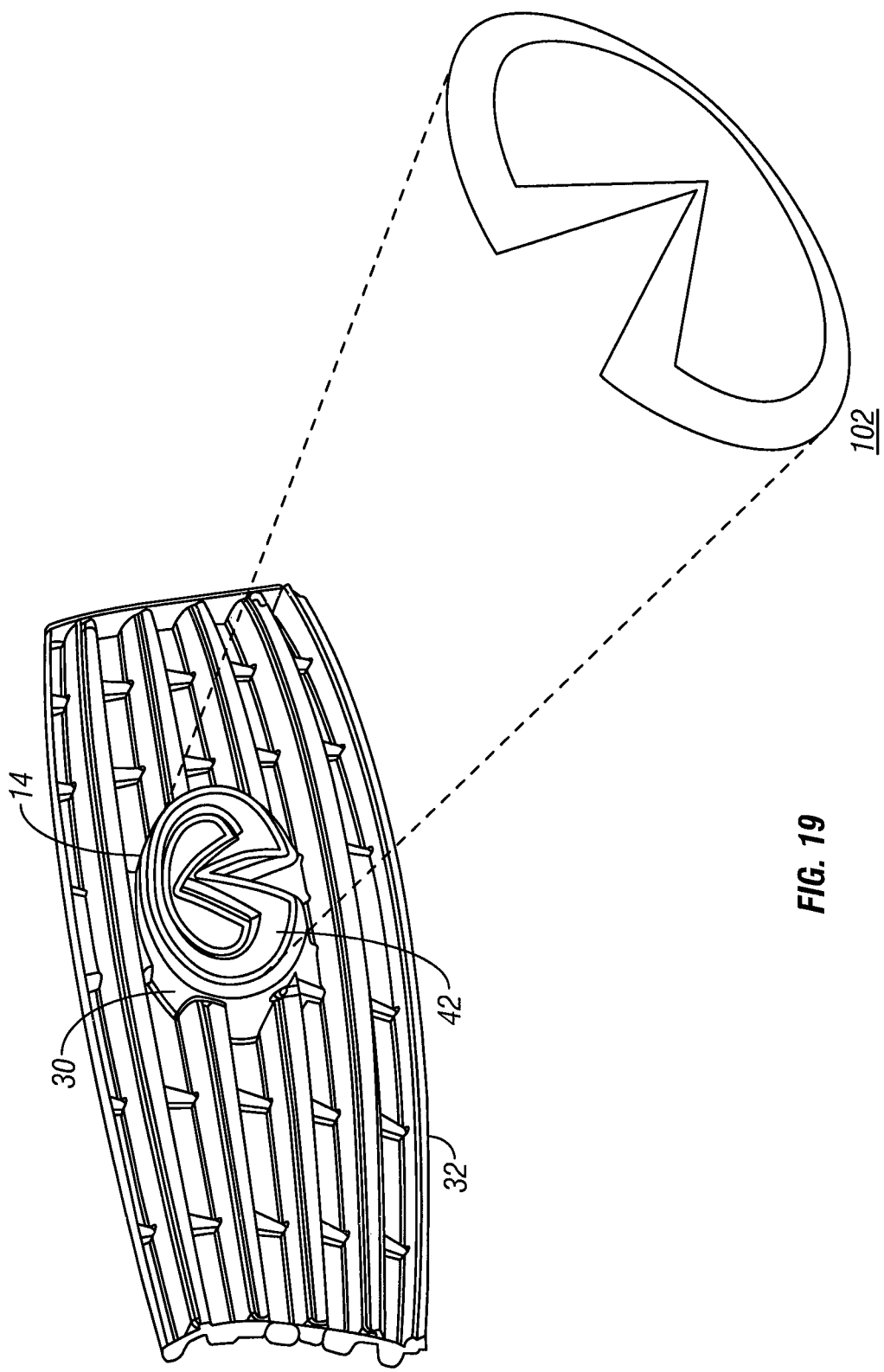
FIG. 19 is a side perspective view of an illuminated emblem attached to a front grille of a vehicle according to one embodiment showing the illuminated emblem projecting the emblem shape on an adjacent surface.

Referring now to FIGS. 18 and 19, an illuminated emblem in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As illustrated in FIG. 18, in one embodiment, the translucent portion 60 is disposed on the first and second front surfaces of the body portion 43. In this embodiment, the lighting device 44 is configured and arranged to project the predetermined pattern onto an adjacent surface 102, as shown in FIG. 19. That is, the lighting device 44 is configured to be able to produce sufficient light so as to be able project light through the translucent portion 60 and onto an adjacent surface 102, such as the street or on a wall within a predetermined distance. The direction of the projection can be any desired. For example, the emblem 42 may be positioned on the front part 38 of the host vehicle 100 so as to enable the lighting device 44 to project the emblem 42 onto a wall surface that is generally transverse to the ground. Additionally, the emblem 42 may be positioned so as to enable the lighting device 44 to project the emblem onto the ground adjacent the host vehicle 100.

Since the translucent portion 60 and the opaque portion 62 are arranged in a predetermined pattern, the light from the lighting device 44 may be emitted through the body portion 43 so as to project light though the translucent portion 60 of the emblem 42 onto a surface adjacent the emblem. It is noted that the projected emblem may be projected in any color desired and in any of the situations described herein or in any other suitable situation (e.g. when reversing).

Third Embodiment

Figure 20:
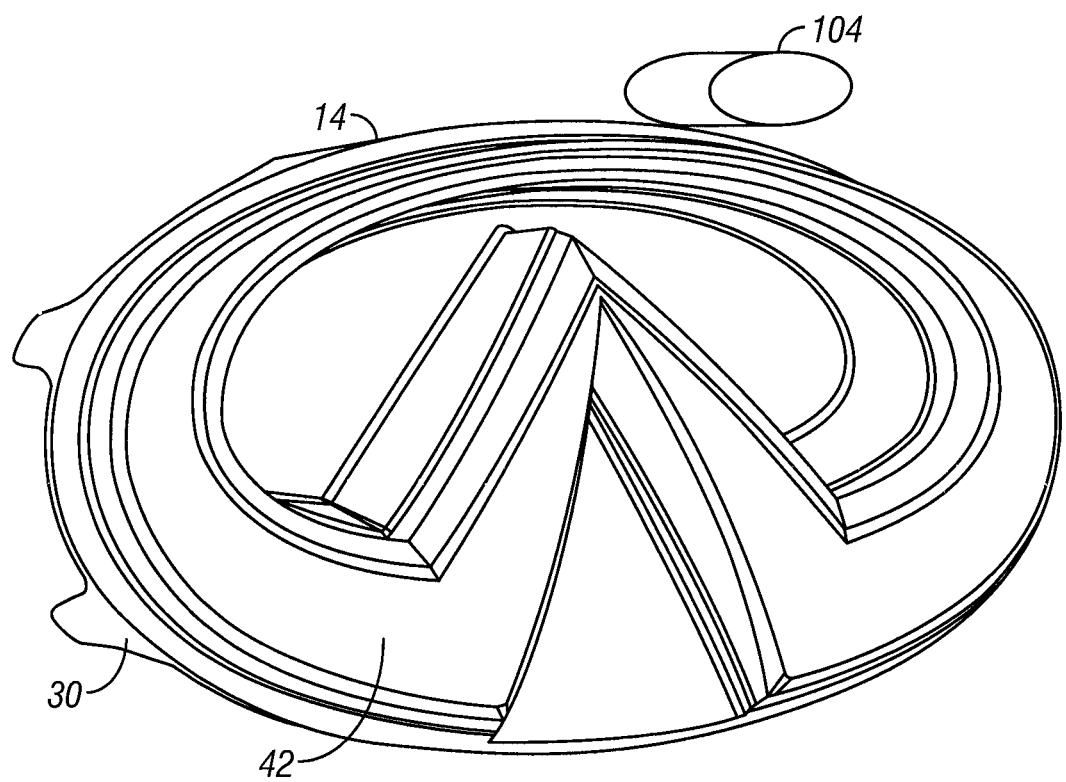
FIG. 20 is a side perspective view of an illuminated emblem according to one embodiment of the present invention in which the emblem shape may be projected on an adjacent surface using a image projector.
Figure 21:
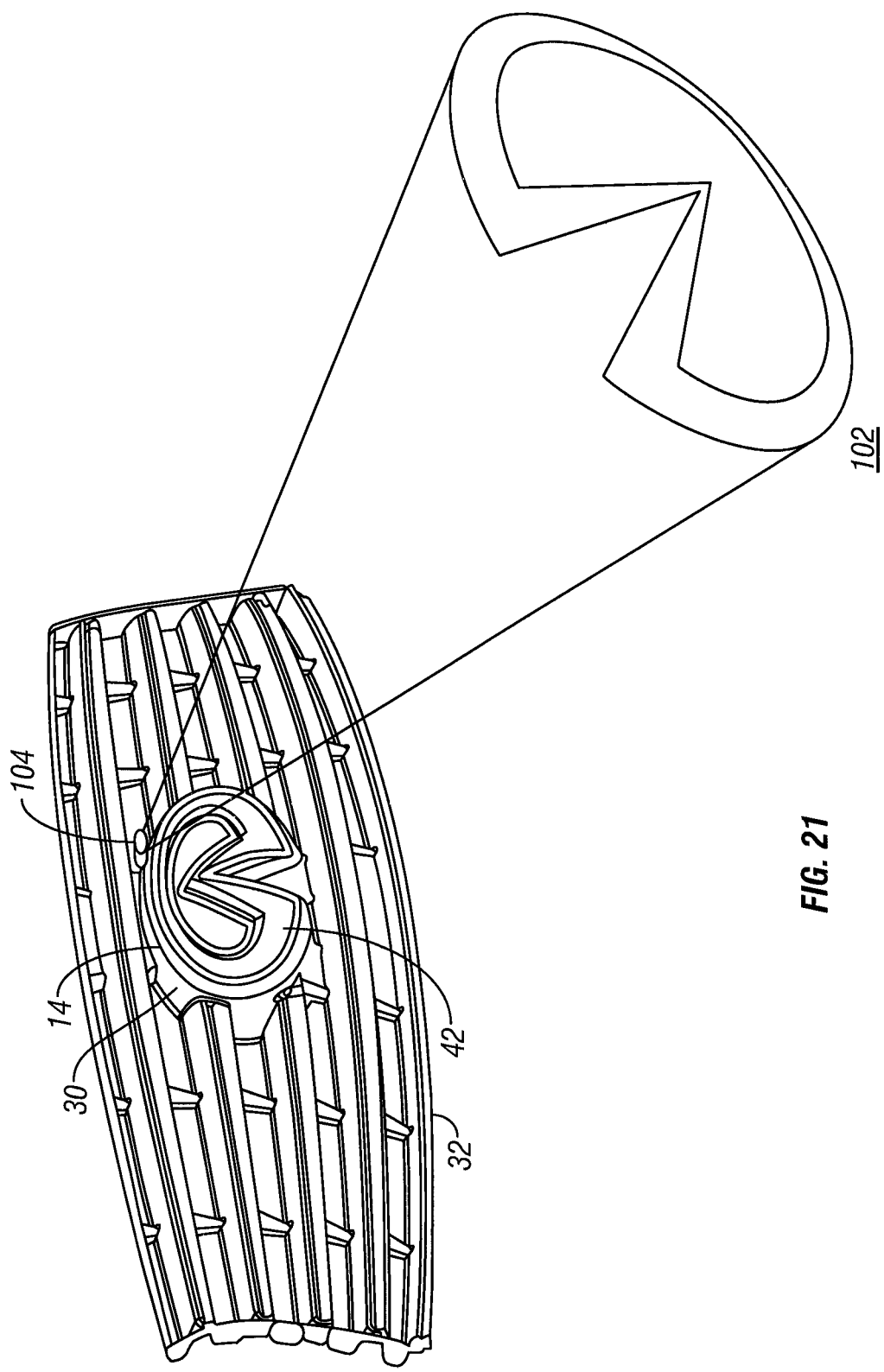
FIG. 21 illustrates the illuminated emblem according to FIG. 20 projecting the emblem shape on an adjacent surface.

Referring now to FIGS. 20 and 21, an illuminated emblem in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In one embodiment, as shown in FIGS. 20 and 21, an image projector 104 may operate in conjunction with the emblem device 14. In this embodiment, the image projector is disposed or positioned adjacent the outer periphery 54 or the body portion 30. The image projector is configured to be capable of projecting the emblem onto a surface 102 adjacent the host vehicle 100. The direction of the projection can be any desired. For example, the emblem 42 and image projector 104 may be positioned on the front part 38 of the host vehicle 100 so as to enable the image projector 104 to project the emblem 42 onto a wall surface that is generally transverse to the ground. Additionally, the emblem 42 and image projector 104 may be positioned so as to enable the image projector 104 to project the emblem onto the ground adjacent the host vehicle 100.

The image projector 104 may operate with the emblem device 14 illuminated or not illuminated. Moreover, the image projector 104 may be positioned in any suitable position and not necessarily immediately adjacent the outer periphery 54 of the body portion 30 of the emblem device 14. It is noted that the projected emblem may be projected in any color desired and in any of the situations described herein or in any other suitable situation (e.g. when reversing).

The braking system 28, battery 26 and engine 22 are conventional components that are well known in the art. Since braking system 28, battery 26 and engine 22 are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the term "portion" when used in the singular can have the dual meaning of a single part or a plurality of parts. Also as used herein to describe the above embodiment(s), the following directional terms "forward", "rearward", and "above", as well as any other similar directional terms refer to those directions of a vehicle equipped with the Illuminated Emblem. Accordingly, these terms, as utilized to describe the present invention should be interpreted relative to a vehicle equipped with the Illuminated Emblem.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An emblem device comprising:
   a back plate;
   an emblem overlying the back plate, and having a translucent portion and an opaque portion, the translucent portion including an inner translucent portion and an outer translucent portion, the emblem has an inner periphery and an outer periphery, and the inner translucent portion is adjacent the inner periphery and the outer translucent portion is adjacent the outer periphery; and
   a lighting device disposed between the emblem and the back plate, and being configured and arranged to be able to disperse light though the translucent portion of the emblem.

2. The emblem device according to claim 1, wherein the emblem has an outer perimeter and the translucent portion is adjacent the outer perimeter.

3. The emblem device according to claim 1, further comprising
   a lighting circuit disposed between the emblem and the back plate, and wherein the lighting device is at least one lamp disposed on the lighting circuit.

4. The emblem device according to claim 3, further including
   tape disposed between the lighting circuit and the back plate.

5. The emblem device according to claim 1, wherein the back plate has an inner periphery, an outer periphery, an inner protrusion extending from the inner periphery and an outer protrusion extending from the outer periphery.

6. The emblem device according to claim 5, wherein the emblem as an inner periphery and an outer periphery, the inner and outer periphery of the emblem having inner and outer projections, respectively, configured to be positioned adjacent the inner and outer protrusions of the back plate, respectively so as to encapsulate the lighting device.

7. The emblem device according to claim 1, wherein the translucent portion is a translucent polycarbonate material, and the opaque portion is a non-translucent polycarbonate material.

8. A vehicle emblem comprising:
a body portion configured to overlie a back plate, and having a translucent portion and an opaque portion,
the translucent portion being configured to enable light from a lighting device to be dispersed therethrough, the translucent portion including an inner translucent portion and an outer translucent portion, the emblem has an inner periphery and an outer periphery, and the inner translucent portion is adjacent the inner periphery and the outer translucent portion is adjacent the outer periphery.

9. The vehicle emblem according to claim 8, wherein the body portion has an outer perimeter and the translucent portion is adjacent the outer perimeter.

10. The vehicle emblem according to claim 8, wherein the translucent portion is a translucent polycarbonate material, and the opaque portion is a non-translucent polycarbonate material.

11. A vehicle grille assembly comprising:
a grille base;
a back plate attached to the grille base, and having an outer periphery, and an outer protrusion extending from the outer periphery;
an emblem overlying the back plate, and having a translucent portion and an opaque portion; and
a lighting device disposed between the emblem and the back plate, and being configured and arranged to be able to disperse light though the translucent portion of the emblem.

12. The vehicle grille according to claim 11, wherein the emblem has an outer perimeter and the translucent portion is adjacent the outer perimeter.

13. The vehicle grille according to claim 11, wherein the translucent portion includes an inner translucent portion and an outer translucent portion, the emblem has an inner periphery and an outer periphery, and the inner translucent portion is adjacent the inner periphery and the outer translucent portion is adjacent the outer periphery.

14. The vehicle grille according to claim 11, further comprising
a lighting circuit disposed between the emblem and the back plate, and wherein the lighting device is at least one lamp disposed on the lighting circuit.

15. The vehicle grille according to claim 13, further including
tape disposed between the lighting circuit and the back plate.

16. The vehicle grille according to claim 11, wherein the back plate has an inner periphery and an inner protrusion extending from the inner periphery.

17. The vehicle grille according to claim 16, wherein the emblem as an inner periphery and an outer periphery, the inner and outer periphery of the emblem having inner and outer projections, respectively, configured to be positioned adjacent the inner and outer protrusions of the back plate, respectively.

18. The vehicle grille according to claim 11, wherein the translucent portion is a translucent polycarbonate material, and the opaque portion is a non-translucent polycarbonate material.

19. An emblem device comprising:
a back plate the back plate has an outer periphery, and an outer protrusion extending from the outer periphery;
an emblem overlying the back plate, and having a translucent portion and an opaque portion; and
a lighting device disposed between the emblem and the back plate, and being configured and arranged to be able to disperse light though the translucent portion of the emblem.

* * * * *